United States Patent Office 3,535,851
Patented Oct. 27, 1970

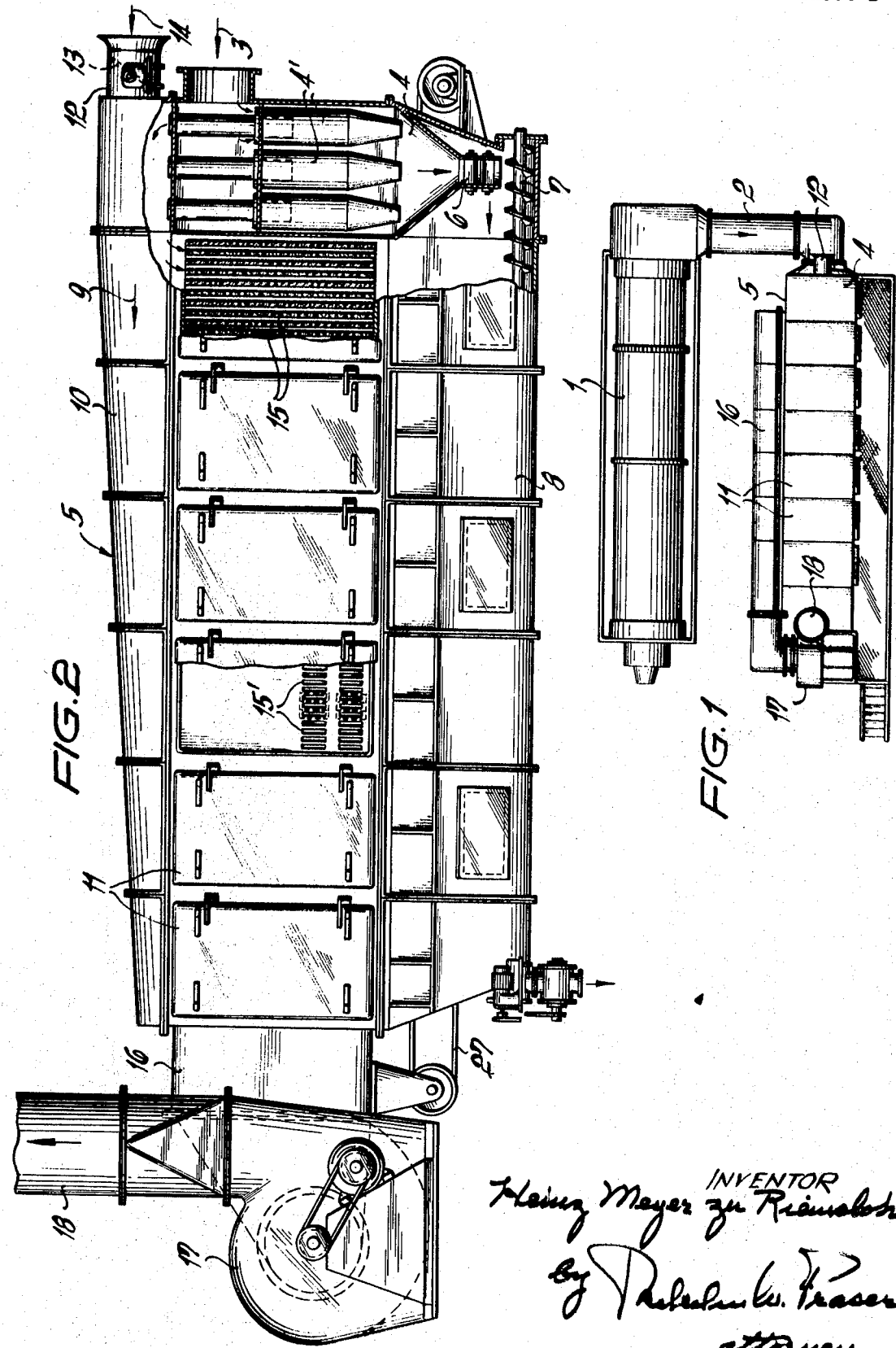

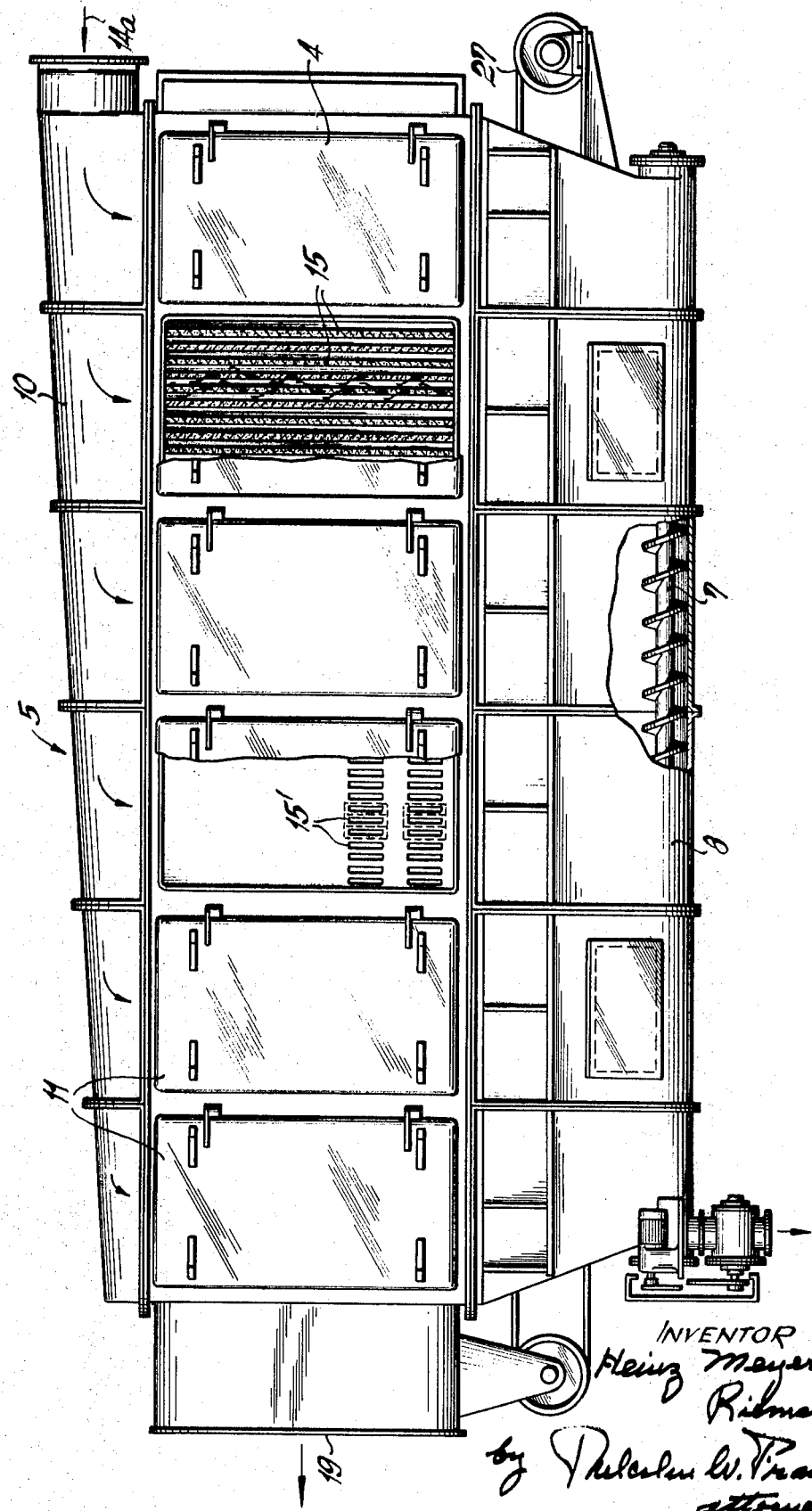

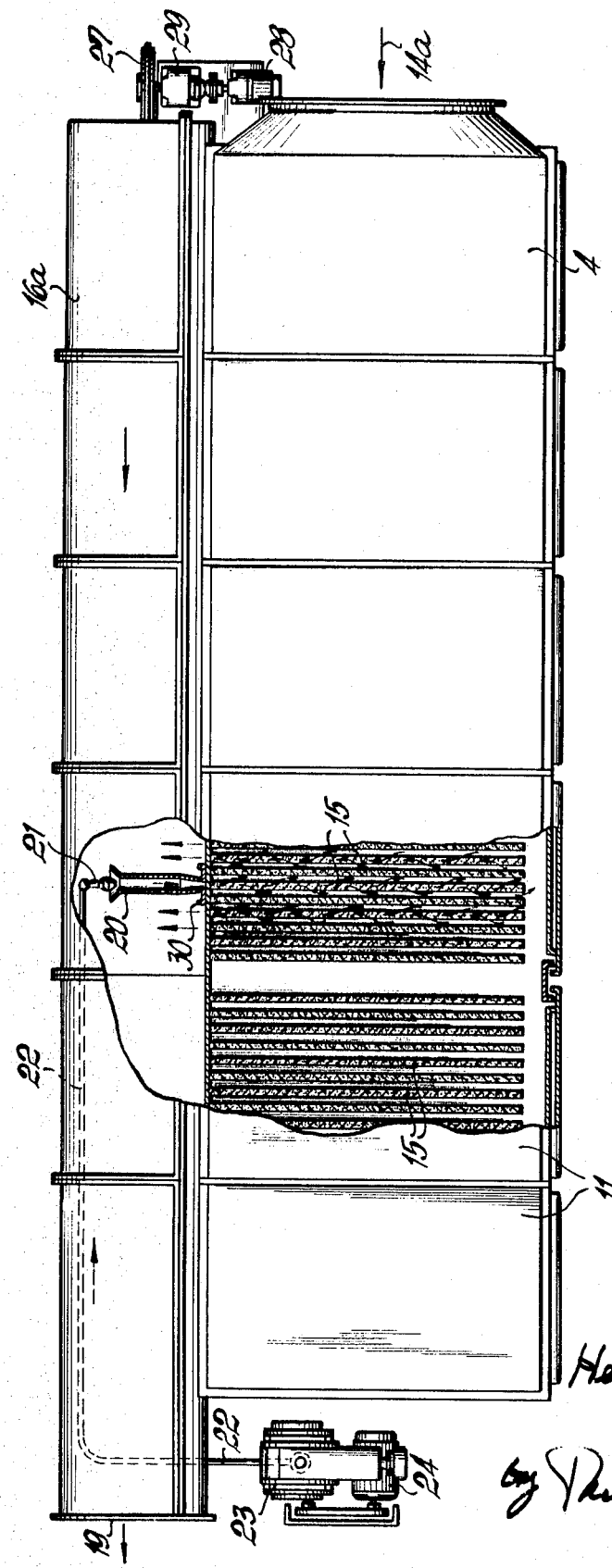

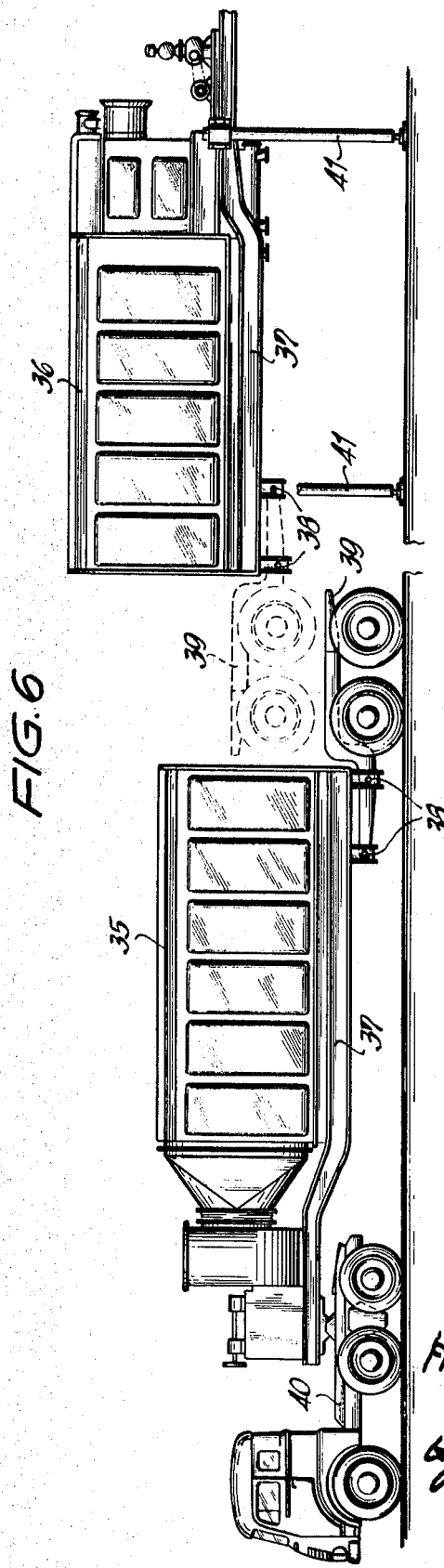

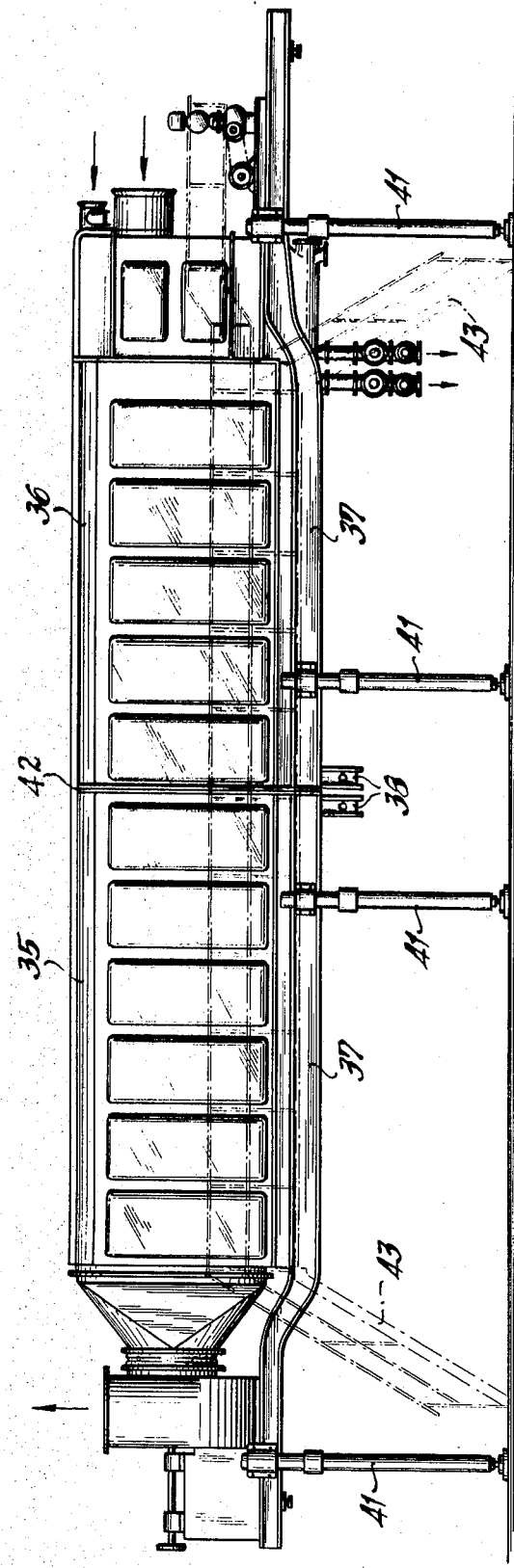

3,535,851
**PORTABLE PLANT FOR REMOVAL OF
DUST FROM HOT GASES**
Heinz Meyer Zu Riemsloh, Marl-Sinsen, Germany, assignor to Staub- und Stromungs-Technische Gesellschaft m.b.H. & Co. KG, Marl-Huls, Germany, a corporation of Germany
Filed July 8, 1968, Ser. No. 743,253
Claims priority, application Germany, May 30, 1968,
St 22,666
Int. Cl. B01d 46/04, 50/00
U.S. Cl. 55—294
6 Claims

ABSTRACT OF THE DISCLOSURE

The invention consists of separable separating units for the establishment of a portable plant for the removal of dust from hot gases, especially waste gases obtained from the processing of bituminous road-building materials by the use of drying drums, cyclone and cloth filter chambers, by which preliminary dust extraction is effected.

SUMMARY

The quick erection of dust extraction plants from suitable units is especially urgent with the processing of bituminous road-building materials, because a flue gas-stream mixture is withdrawn from the drying drums which shows a maximum water substance of 40% and a temperature on discharge from the drying drum of approximately 160° C. For this, dry dust removal is especially desired because the sludge occurring with wet dust removal is difficult to remove.

The innovation as a technical problem is based upon the construction of a dry dust removal plant for hot gases of the above character, which can be transported over the road in a few component parts and thus makes it possible to erect such dust removal plants wherever bituminous processing plants are installed.

According to a fundamental concept of the invention, the solution of this problem is achieved by a housing separated into units, which are individually transportable on the particular road-going chassis and can be assembled at the plant. The units are separated into several chambers, of which at least one chamber contains a multiplicity of axial cyclones for the separation of coarse dust and the other chambers contain the filter pockets provided with cloth filters. This division of the housing into a multiplicity of chambers produces a compact structure for the entire dust removal plant and by dividing the housing into two units, these can be transported on a trailer-axle chassis, constructed as semi-trailers. From these units the plant can be assembled on the spot in a simple manner, whereby the wheeled chassis is removed and the plant remains fixed until it is dismantled and transported to another place of use.

Nozzles provided with injectors supplied by compressed air are used for cleaning the filter pockets and these are acted upon by the hot gas coming out of the cloth filters. While the cleaning of the filter pockets with scavenging air is a state of the technique, the new style use of clean gas for the scavenging of the filter pockets with the help of these injectors has the advantage that the point of condensation on the filter pockets is not fallen below. For this reason the undesired cementing of the cloth filter cannot occur, because the predominant portion of the scavenging air consists of the hot clean gas.

The simplicity of the whole plant contributes importantly to its compactness, which in turn facilitates portability. A temperature-controlled device enabling the addition of fresh air after the removal of coarse dust is also provided.

BRIEF DESCRIPTION OF THE DRAWINGS

FIG. 1 is a top diagrammatic view of a group of components in assembled form according to the invention for a plant for the dust removal from hot gases;

FIG. 2 is a side view of the group of components shown in FIG. 1;

FIG. 3 is a side view of a modified form of the housing;

FIG. 4 is a top view of the housing shown in FIG. 3;

FIG. 6 is a side view of a housing divided into two units according to the invention with a trailer arrangement for same; and FIG. 7 is a side view of the finished dust removal plant assembled from the units according to FIG. 6.

DESCRIPTION OF PREFERRED EMBODIMENT

Figure 5:
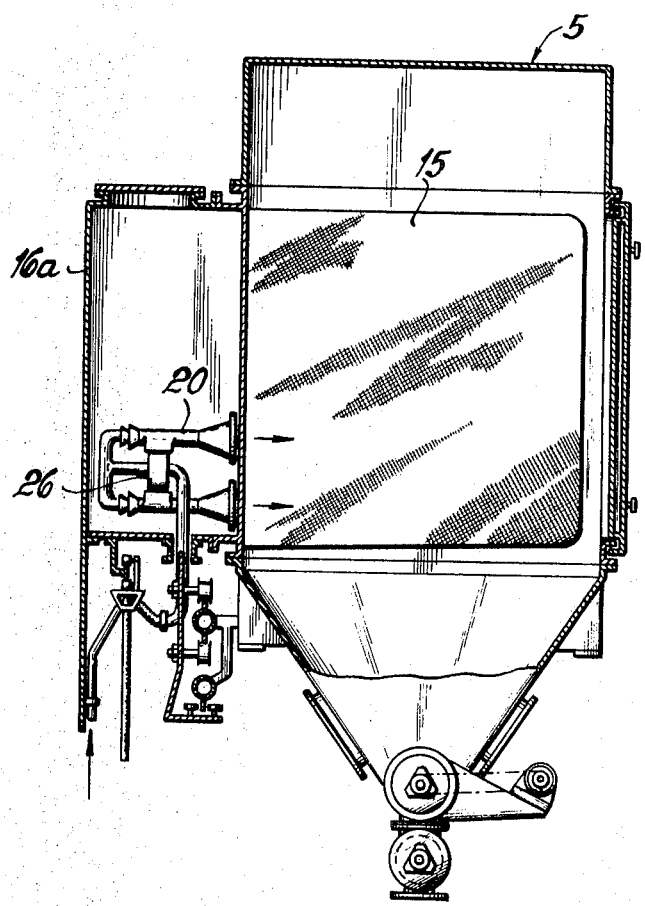
FIG. 5 is a front view with parts broken away of the housing shown in FIGS. 3 and 4.

FIG. 1 shows a drying drum 1 as used for the processing of bituminous road-building materials. The flue gas-steam mixture from the drying drum 1 passes through pipes 2 and 3 (compare FIG. 2) into a first chamber 4 of a housing 5. In the chamber 4 is disposed in closely packed relation a multiplicity of parallel connected axial cyclones 4', which separate the coarse dust particles by centrifugal force from the hot gases and discharge them through their lower openings. The discharged dust particles pass through pendulum valves 6 into a discharge screw 7, which is arranged in a trough 8 below the chambers of the housing 5.

The gases with the preliminary dust removed flow to a location 9 in a channel 10, to which are connected several parallel chambers 11 with openings 15'. A supply air feed pipe 12 is controlled by a temperature responsive valve 13, so that at 14 fresh air can be introduced into the channel 10 for cooling the hot gases from which the preliminary dust has been removed. The control results in dependency of the exit temperature of the gases with preliminary dust removed out of the housing 5 so that a maximum allowable temperature of approximately 160° C. is not exceeded in the following cloth filters.

The fine dust removal takes place in filter pockets 15 arranged in the filter housing, which consists of the chambers 11. The clean gases passing from the filter pockets 15 enter a clean gas channel 16 to which they are sucked by a blower 17 and forced into a chimney 18.

In the form of the invention shown on FIG. 3, the chimney 18 and blower 17 are not shown. The hot gases enter the housing 5 at 14a, while the dust-removed clean gases arrive in the channel 16a, from which they are discharged at 19.

For cleaning the filter pockets, nozzles 20 are used. As best shown in FIG. 4, the end of each nozzle 20 opens into the clean gas channel 16a and is provided with an injector nozzle 21, which receives compressed air through a hose line 22 from a blower 23, which is driven by a motor 24. The nozzle arrangement is carried by a cleaning carriage 26 having a traction rope 27, which is driven by a motor 28 through gearing 29. The cleaning carriage has covers 30 which close the filter pockets, and are arranged on both sides of the cleaned filter pockets.

FIGS. 6 and 7 show the plant according to FIGS. 1 and 2, and illustrate the separation of the housing 5 into two units 35 and 36. Each of these units rests on an offset portion of a frame 37 to which at 38 a wheeled chassis 39 is detachably connected. The front portion of the frame 37 is constructed like a semi-trailer and is similarly connected to a hauling tractor 40.

The frame 37 may be equipped with collapsible legs 41, on which it is supported when the chassis 39 is removed and the plant is to be assembled for use. The units 35 and 36 are detachably connected by bolts. Obviously additional parts can be provided, for example stairs 43 for providing access.

Practical experience has shown that a plant of this kind shows a resistance of about 160 mm. WS at a maximum waste gas temperature of 160° C. with a dust load up to a maximum 300 g./Em.$^3$ waste gas. Plants constructed from dust removal wheels reach a value of up to 99.98% with a drying of rock materials of the usual particle size distribution, so that the best dust discharge with safety could be limited to values under 0.15 g./Em.$^3$ waste gas.

What I claim is:

1. A mobile apparatus capable of being assembled and disassembled at the sites of use for the removal of dust from hot gases evolved from bituminous road building plants comprising:

a housing comprising means defining a plurality of adjacent chambers mounted on a support frame and a gas channel adjacent to and connecting said chambers comprising fresh air inlet means;

at least one of said chambers comprising axial inlet cyclones extending across said chamber, dust laden hot air inlet means, hot air exit means spaced from said inlet means and connected to outlets of said cyclones and to said gas channel means near said fresh air inlet means, whereby coarse dust can be removed from said dust laden hot air, and whereby said hot gas exiting from said cyclone chamber can be cooled by fresh air entering said gas channel;

at least another one of said chambers comprising filter cloth pockets disposed across said chamber adapted to receive said hot gases from said cyclone chamber through said gas channel for removing fine dust from said hot gases;

a clean gas channel comprising exit means adjacent to and connected to said filter pocket chamber for receiving clean gases from said filter pockets;

means for cleaning said filter pockets comprising jet air means on carriage means mounted in said clean gas channel directing cleaned hot air from said clean gas channel into said filter pockets and means for causing said carriage means to traverse said filter pockets; and wheel means connected to said support frame for transporting said apparatus.

2. An apparatus claimed in claim 1, comprising means providing a trough below the housing for receiving dust particles and means for discharging these dust particles from the trough.

3. An apparatus claimed in claim 1, wherein said clean gas channel communicates with a blower for discharging the clean gas from the channel.

4. An apparatus claimed in claim 1, wherein said cleaning means comprises an injector for directing cleaning air into the pockets in the form of a jet, a nozzle for surrounding the jet discharged by the injector, a gap being left between an upstream end of the nozzle and the injector for the suction of air into the nozzle by the jet, and means for supplying compressed air to the injector.

5. An apparatus claimed in claim 1, comprising a temperature responsive valve in said fresh air inlet means for controlling the access of air from the atmosphere to said hot gases.

6. An apparatus claimed in claim 1, which can be divided up into two units of the housing containing said chambers and comprises collapsible legs for supporting the two units.

References Cited

UNITED STATES PATENTS

| | | | |
|---|---|---|---|
| 2,792,074 | 5/1957 | Schilb et al. | 55—341 |
| 2,867,289 | 1/1959 | Sare | 55—341 |
| 2,907,406 | 10/1959 | Baden et al. | 55—343 |
| Re. 24,954 | 3/1961 | Church | 55—96 |
| 3,071,915 | 1/1963 | Hardy | 55—337 |
| 3,146,080 | 8/1964 | Ruble et al. | 55—302 |
| 3,186,021 | 6/1965 | Krier et al. | 15—340 |
| 3,266,225 | 8/1966 | Barr | 55—293 |
| 3,304,572 | 2/1967 | Wendel | 15—352 |
| 3,308,609 | 3/1967 | McCulloch et al. | 55—342 |
| 3,362,353 | 1/1968 | Johnson et al. | |
| 3,372,534 | 3/1968 | Hysinger et al. | 55—341 |
| 3,395,512 | 8/1968 | Finney et al. | 55—341 |

FOREIGN PATENTS

| | | |
|---|---|---|
| 1,009,993 | 11/1965 | Great Britain. |
| 429,442 | 5/1935 | Italy. |
| 529,428 | 6/1955 | Italy. |

FRANK W. LUTTER, Primary Examiner

B. NOZICK, Assistant Examiner

U.S. Cl. X.R.

15—340; 55—302, 337, 341, 343, 356